Aug. 25, 1931.  J. A. GAYNOR  1,820,187
RECORDING MEANS FOR READINGS OF THEODOLITES AND THE LIKE
Filed Feb. 28, 1928   2 Sheets-Sheet 1

INVENTOR
BY JAMES A. GAYNOR,
ATTORNEY

Aug. 25, 1931.  J. A. GAYNOR  1,820,187
RECORDING MEANS FOR READINGS OF THEODOLITES AND THE LIKE
Filed Feb. 28, 1928   2 Sheets-Sheet 2

JAMES A. GAYNOR,
INVENTOR
BY Julian J. Wittal
ATTORNEY

Patented Aug. 25, 1931

1,820,187

UNITED STATES PATENT OFFICE

JAMES A. GAYNOR, OF BROOKLYN, NEW YORK

RECORDING MEANS FOR READINGS OF THEODOLITES AND THE LIKE

Application filed February 28, 1928. Serial No. 257,587.

This invention relates generally to vernier readings on precision instruments and has particular reference to improvements such as the theodolite or surveying transit, employing the well known vernier plates for determining deflection angles in plotting surveys in road work, farm lands, streets, crossings, and general surveying such as field work.

The object of the invention is to provide means in a theodolite for permanently recording the vernier readings of the instrument at the successive stations in field and other surveys in such manner that errors in the records of such surveys are impossible.

Much lost time, added expense and embarrassment have resulted from accident or negligence and inattention on the part of field workers to properly record the successive "settings" in their note books in the progress of a survey.

In the use of the device constituting my invention, it is only necessary to manipulate a screw or plunger, after a vernier setting has been determined, to provide a printed record of the positions of the vernier plates, said plates being provided with preferably raised graduation lines or marks, over which, strips of paper and a carbon strip may be positioned.

Broadly, the invention contemplates providing recording means for vernier settings to materially expedite and reduce the cost of field survey work.

As is well known, in determining angles by the use of the transit, the reading of the degrees is executed on a full circular scale by the use of a vernier scale which is rotatable around the main or degree scale and which enables the operator to exactly read the fractions of a degree beyond his last degree mark, in minutes. Even the best operator is apt to make a mistake once in a while and with the recording means now employed a great amount of time and labor is needed thereafter to locate and correct the mistake.

To obviate this drawback of the present method in measuring and recording angles, I preferably place both, the full circular degree scale and the vernier reading scale of a theodolite on the cylindrical outside surface of the instrument, raise their markings, and move after every setting a recording element against them so as to permanently take and record the respective readings, as will be described hereinafter.

With these and other objects in view, as will more fully appear as the description proceeds, the invention consists of certain constructions, arrangements and combinations of the parts that I shall hereinafter fully describe and claim.

For a full understanding of the invention, reference is to be had to the following description and accompanying drawings in which, Fig. 1 is an elevation of a theodolite with my invention attached thereto, parts being broken away or omitted.

Like reference characters mark the same parts wherever they occur in the drawings.

Figure 1:
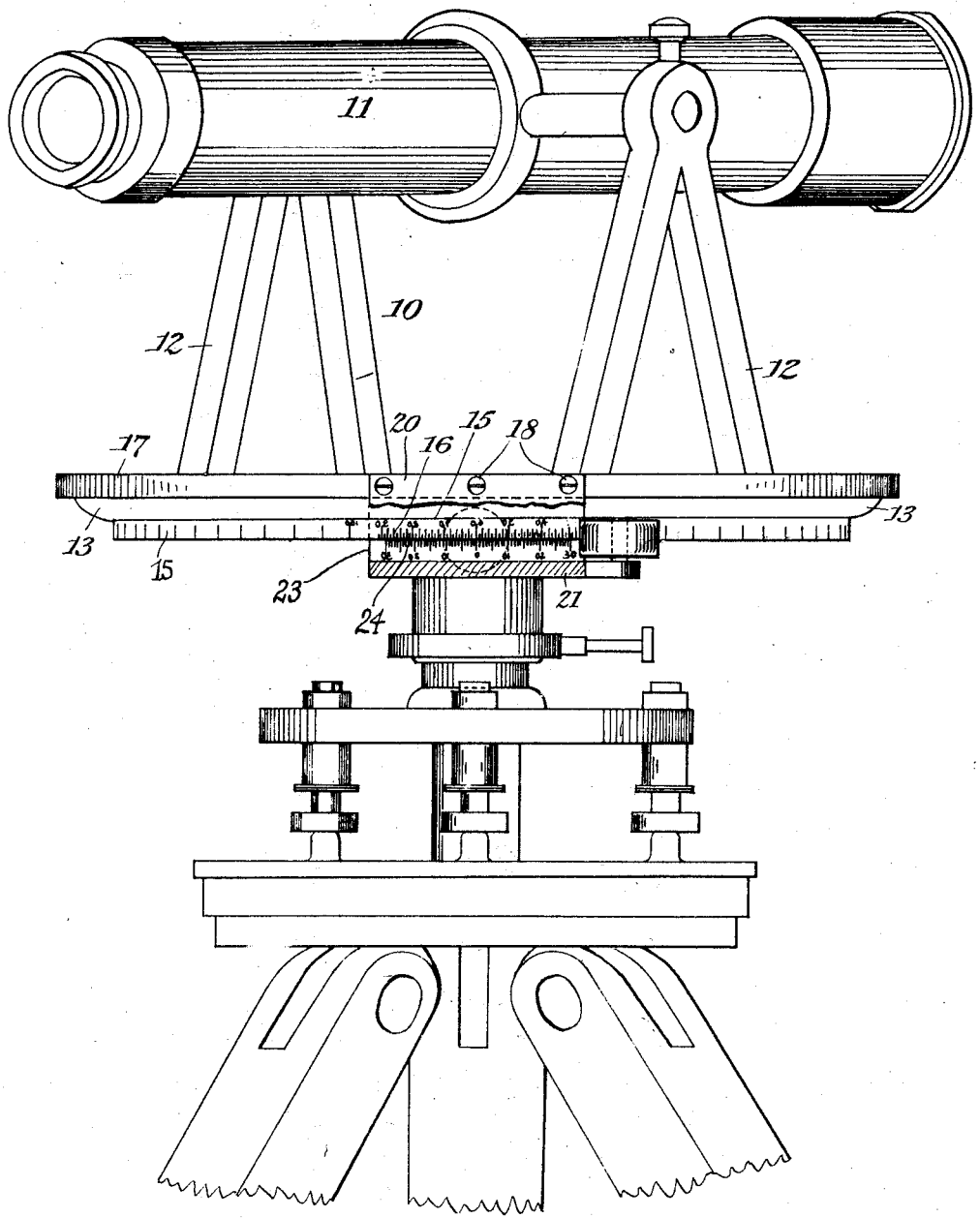

Referring to the drawings, I show at 10 a theodolite or surveyor's transit in a general way, parts being omitted. A telescope 11 is mounted by legs 12 on the usual ring plate 17, to which is fastened as by screws 14 my outside vertical degree scale ring 15, provided with raised or ribbed graduations 16 or markings similar in exactness to those in standard theodolites, on its peripheral face.

To the outer rim plate 17 of the theodolite is bolted as at 18, a bracket 19 constituted by an arcuate front wall 20, and a base or table portion 21 to which is bolted, as at 22, a minute vernier sector 23, provided with raised graduations 24, also similar in exactness to the minute vernier markings of standard theodolites. The two peripheral scales 16 and 24 are in exact alignment.

A hand screw 25, having an operating head 26, is threaded through the front wall 20 of the bracket 19 and swiveled, as at 27, to an arcuate plate 28, which carries a rubber or other pad 29.

Figure 2:
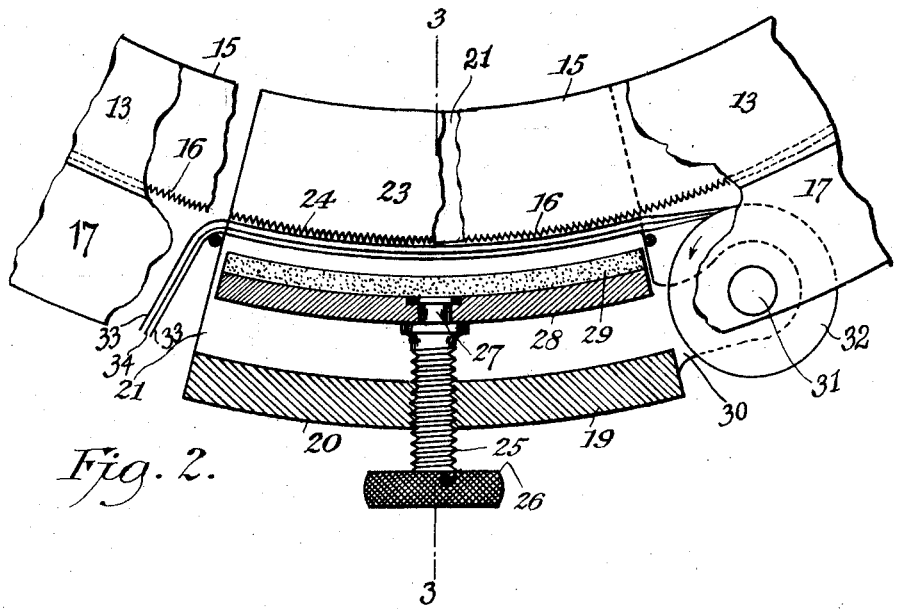
Fig. 2 is a fragmentary enlarged plan view, partly broken away and partly in section, disclosing the recording means of my invention.
Figure 3:
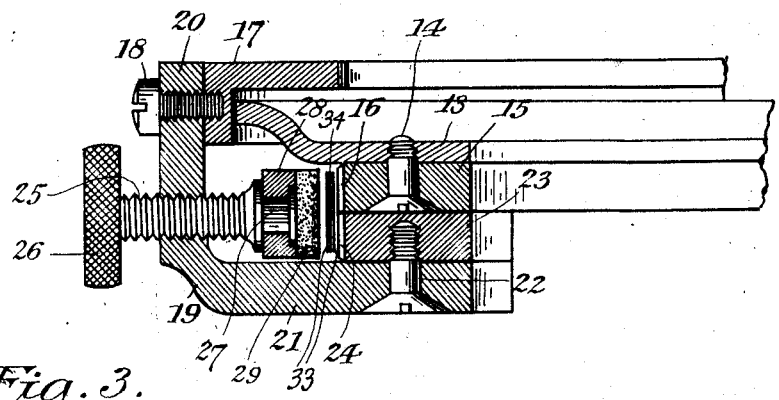
Fig. 3 is a sectional view taken about on the line 3—3 of Fig. 2.

The base 21 of the bracket 19, is formed at the right hand side of it with a horizontally extending lug or projection 30, from which a pin 31 projects upwardly. A spool or roll 32 of appropriate paper strips 33 with the usual carbon strip 34 therebetween is mounted to rotate on the pin 31, so that when a record of a vernier setting in field work is made by impressing the paper strips against the raised graduations of the degree and minute verniers, through the instrumentality of the hand screw 25, the printed strip may be drawn to the left as in Fig. 2 of the drawings to bring a blank strip portion into position for printing the next setting at the next angle or station, and this operation is repeated at each progressive angle reading.

Each printed record may be torn off and appropriately stored or kept as by pasting them in the regular surveyor's record book.

Instead of only one spool 32 a second one may be also employed at the left hand side of my recording vernier scale and the printed tape wound up thereon. Several tapes also may be used with several carbon strips between them and a desired number of records taken and separately used.

It will be obvious that my improvement is adapted to be added to any existing standard theodolite with very little expense and labor and new theodolites may be manufactured embodying my invention without materially changing their present forms and manufacturing methods.

It is also obvious that other means of recording and printing may be employed within the spirit of the present invention and that this invention may be used to great advantage in many other instances where the relative position of various scales is desired to be permanently recorded.

Changes and variations may be made in the construction of the parts within the limits of the claims without departing from the spirit and scope of the invention.

What I claim as new is:

1. In a theodolite, having a stationary element and a rotatable element, in combination, a ring scale on said stationary element; an arm secured to said rotatable element; a scale carried by said arm in surface alignment with said scale on said stationary element, and means carried by said arm to take an impression of a desired relative position of the scales.

2. In a theodolite having a stationary element and a rotatable element, in combination, a ring scale on said stationary element; an arm secured to said rotatable element; a scale carried by said arm in surface alignment with said scale on said stationary element, and means carried by said arm to take an impression of a desired relative position of the scales, said scales having vertical cylindrical surfaces carrying raised markings, and said means to take an impression of said scales including strips of paper and carbon ribbons carried by a roll on said arm and adapted to be drawn over said scales, and a resilient pad carried by a bolt threaded through said arm whereby to move the same towards or away from said strips, ribbons and scales for effecting intermittent subsequent records of the relative positions of the scales on said strips.

Signed at New York, in the county of New York and State of New York this 24th day of February, A. D. 1928.

JAMES A. GAYNOR.